June 13, 1939.   L. J. BISHOP   2,161,894
DRIVE UNIT
Filed May 10, 1937   2 Sheets-Sheet 1

INVENTOR
LEONARD J. BISHOP
BY *Whittemore Hulbert & Belknap*
ATTORNEYS

June 13, 1939.  L. J. BISHOP  2,161,894

DRIVE UNIT

Filed May 10, 1937  2 Sheets-Sheet 2

INVENTOR
LEONARD J. BISHOP
BY *[signature]*
ATTORNEYS

Patented June 13, 1939

2,161,894

UNITED STATES PATENT OFFICE 2,161,894

DRIVE UNIT

Leonard J. Bishop, Detroit, Mich., assignor to Mechanical Handling Systems, Inc., Detroit, Mich., a corporation of Michigan Application May 10, 1937, Serial No. 141,847

2 Claims. (Cl. 74—286)

The invention relates to drive units and refers more particularly to industrial drive units adapted to drive conveyors.

The invention has for one of its objects to provide a drive unit which is arranged and constructed to form a compact assembly and to be capable of driving at a greatly reduced speed. The invention has for another of its objects to provide a drive unit which is designed to be driven by a constant speed prime mover and to drive a power take-off shaft in either direction at different speeds. The invention has for a further object to so construct a drive unit that its rate of driving from a constant speed prime mover can be varied continuously, instead of step by step.

With these and other objects in view, the invention also resides in the novel combinations and arrangements of parts as more fully hereinafter set forth, reference being had to the accompanying description, claims and drawings, in, which latter Figure 1 is a side elevation of a drive unit showing an embodiment of my invention;

Figure 1:
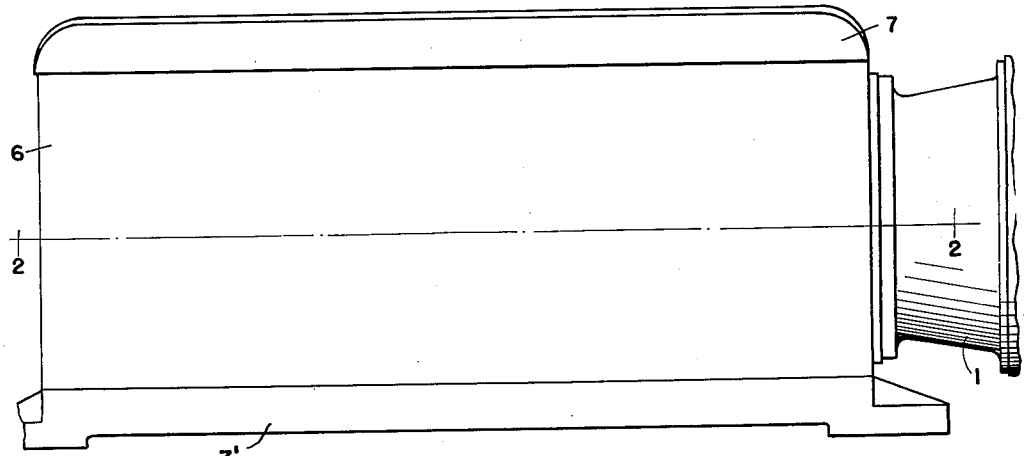
Figure 3:
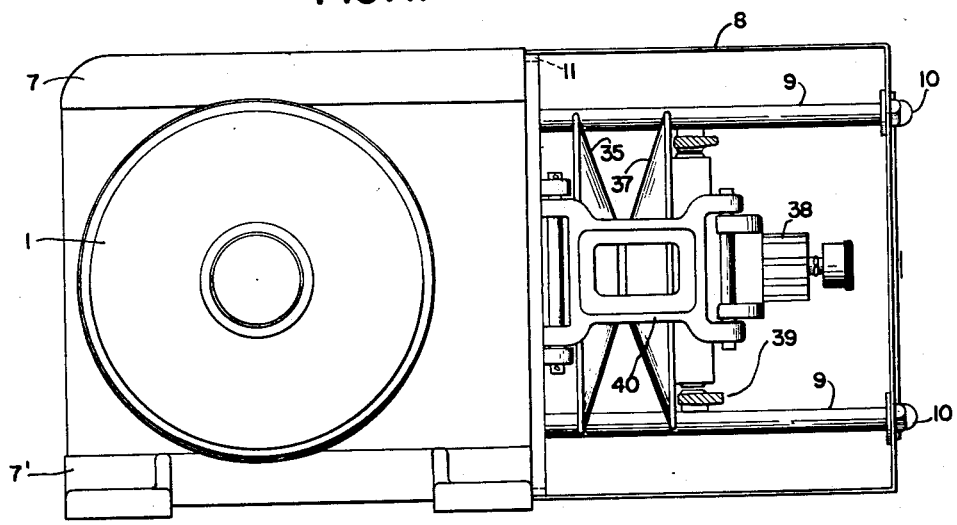
Figure 3 is an end elevation with a part of the housing removed.
Figure 4:
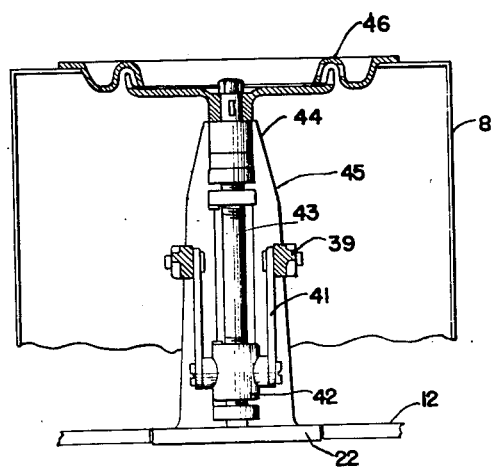
Figure 4 is a cross section on the line 4—4 of Figure 2.
Figure 2:
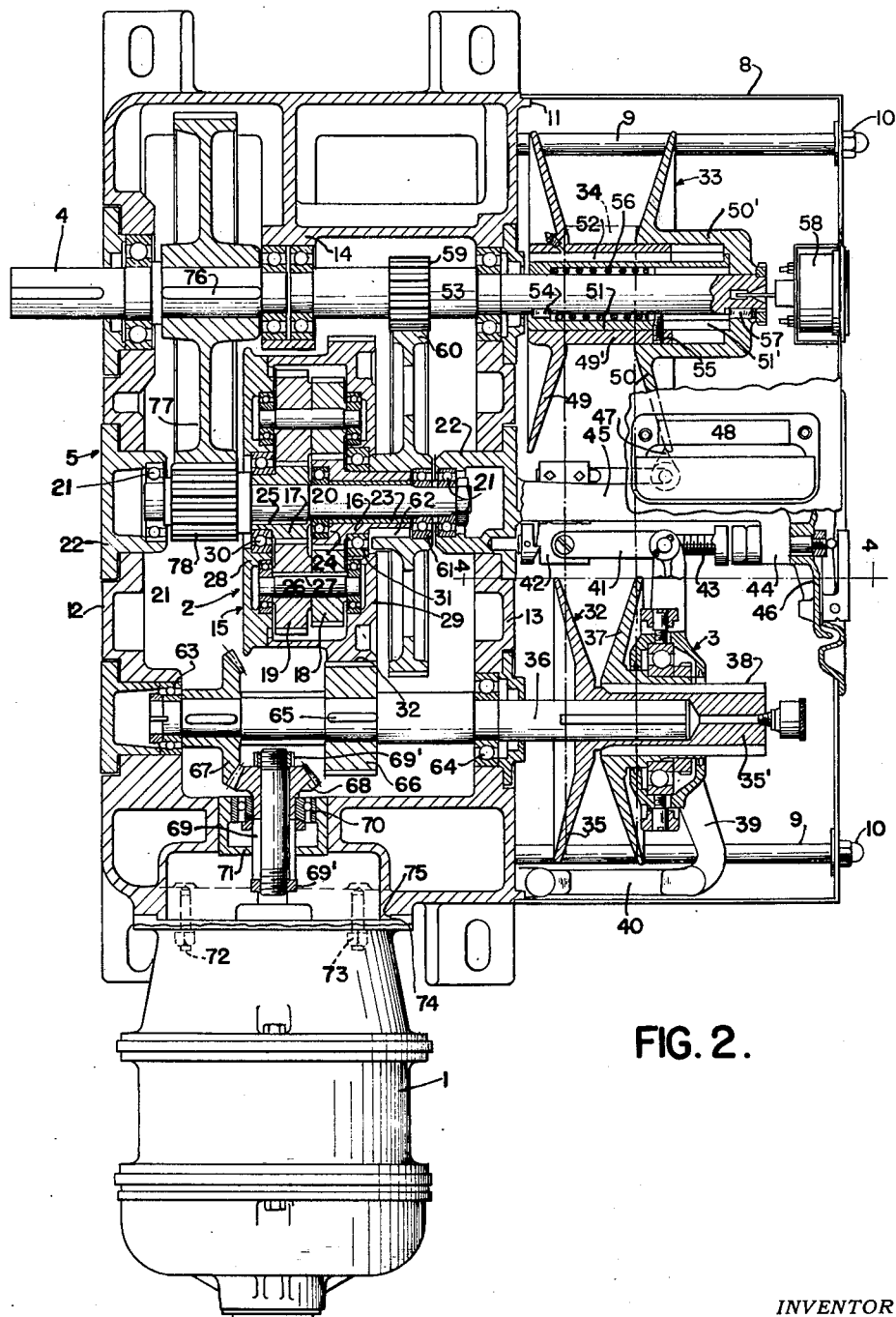
Figure 2 is a cross section on the line 2—2 of Figure 1.

The drive unit is adapted to be driven by the prime mover 1 which, as illustrated in the present instance, is a constant speed electric motor. The drive unit comprises the reducing device 2 and the variable speed device 3 and also preferably comprises the power take-off shaft 4 which is adapted to be driven by the reducing device and to be operatively connected to a conveyor, for example.

5 is the housing for the drive unit, the parts of which are so constructed and arranged that they form a compact assembly capable of effecting a high reduction with the result that the housing occupies relatively small space. The housing comprises the section 6 which carries the reducing device and the variable speed device, the top and bottom sections 7 and 7' detachably secured to the intermediate section 6 and the side section 8 also detachably secured to the intermediate section. The sections 6, 7 and 7' are preferably castings and enclose the reducing device and the power take-off shaft with the exception of its power take-off end. The side section 8 is preferably formed of sheet metal and encloses the variable speed device. The side section, as shown, is detachably secured to the side of the intermediate section by means of the horizontal columns 9 secured to the side of the base section and the nuts 10 threaded upon the columns and abutting the side wall of the side section, the columns serving as spacers. The portion of the side section abutting the intermediate section is preferably positioned by being sleeved over a lateral flange 11 formed integral with the intermediate section. It will be noted that the intermediate section has the integrally spaced side walls 12 and 13 and the integral bearing support 14 between the side walls at one end. The top and bottom sections 7 and 7' are interchangeable to provide for locating the power take-off shaft 4 at either side of the drive unit by turning upside down or inverting the intermediate section 6.

The reducing device 2 is of the epicyclic gear train type and comprises the revoluble frame 15, the drive and driven gears 16 and 17 respectively concentric with the axis of rotation of the frame and the gears 18 and 19 carried by the frame and meshing with the drive and driven gears respectively. The gears 18 and 19 are rotatable as a unit, both about their axes and about the axes of said drive and driven gears. The reducing device also comprises the driven shaft 20 which is concentric with the axes of the frame and the drive and driven gears. This shaft extends between and is journaled in the spaced side walls 12 and 13 of the housing intermediate section. As shown, the ends of the driven shaft 20 are mounted in the anti-friction bearings 21, which in turn are mounted in the supports 22 extending through and secured to the spaced side walls 12 and 13 of the housing intermediate section. The drive gear 16 is journaled upon the sleeve 23 which encircles the shaft and is also journaled upon the shaft through the anti-friction bearing 24 in the zone of the gear 18. The driven gear 17 is suitably secured to the shaft as by means of the key 25. The gears 18 and 19 are arranged in pairs angularly spaced about the frame 15 and the gears of each pair are mounted upon and secured to the shaft 26 as by means of the key 27, this shaft being journaled at its ends in the side sections 28 and 29 which together form the frame housing the pairs of gears 18 and 19. The side sections of the frame are journaled upon extensions of the drive and driven gears 16 and 17 through the anti-friction bearings 30 and 31 respectively. The frame has the external gear 32 which is formed upon the side section 29 in a position to encircle the anti-friction bearing 31. The drive gear 16 is larger and has a greater number of teeth than the driven gear 17. This is also true of the carried gear 19 with respect to the carried gear 18.

The variable speed device 3 is of the Reeves type and comprises the drive and driven pulleys 32 and 33 respectively and the belt 34 extending around these pulleys. Each pulley is formed of opposed cone-faced discs and the sides of the belt are inclined to fit the discs. The drive pulley 32 is formed of the stationary inner disc 35 which is fixed upon the shaft 36 and the axially movable outer disc 37 which is slidably mounted upon the hub 35' of the disc 35 and is secured thereto rotate therewith by suitable means, such as the splines 38. The disc 37 is adapted to be axially moved by means of the yoke 39 which at one end is pivotally connected to the link 40 pivoted upon the side of the housing base section. The other end of the yoke 39 is pivotally connected to the links 41, which are in turn pivotally connected to the nut 42. This nut is threaded upon the crew 43, which at its inner end is journaled in the support 22 mounted in the side wall 13 and at its outer end is journaled in the support 44 formed upon the lateral arm 45 extending from the same support. 46 is a suitable hand wheel upon and fixed to the outer end of the screw 43 for rotating the same. The nut 42 is adapted to actuate the pointer 47 in unison therewith, this pointer being above the housing side section 8 and carried by an upright arm which extends through the opening 48 in the top of the section. The driven pulley 33 comprises the axially movable inner disc 49 and the stationary outer disc 50. The disc 49 is slidably mounted upon the sleeve 51 and is secured thereto to rotate therewith by means of the key 52. The inner end of the sleeve has a reduced inner diameter and is mounted upon the shaft 53 and secured thereto as by means of the key 54. The hub 49' of the disc 49 extends within the hub 50' of the disc 50 and the outer end of the hub 49' has secured thereto the screw 55 which extends through a longitudinally extending slot 51' in the sleeve 51 to adjacent the shaft 53. Located within the sleeve 51 between the shoulder formed by its inner end portion and the screw 55 is a compression spring 56 which tends to urge the disc 49 axially outwardly at all times. The hub 50' is fixedly secured upon the outer end of the shaft 53, the key 57 serving to rotate the shaft with the hub. This hub also serves to position the outer end portion of the sleeve 51 in concentric relation to the shaft 53.

The shaft 53 is journaled at one end in the bearing support 14 and is journaled intermediate its length in the side wall 13, suitable anti-friction bearings being used. The shaft terminates short of the side wall of the side housing section 8 and is adapted to be operatively connected to the speed indicator 58, which is mounted in the side wall. 59 is a gear fixed upon the shaft 53 between the bearing support 14 and the side wall 13. This gear meshes with the gear 60, which is mounted upon an extension of the drive gear 16 and also upon the driven shaft 20, there being the anti-friction bearing 61 between the shaft and the gear. The gear 60 is adapted to drive the drive gear 16 by suitable means, such as the key 62.

The shaft 36 for driving the drive pulley is mounted at one end upon the side wall 12 of the housing intermediate section through a suitable anti-friction bearing 63. This shaft extends through the side wall 13 of the housing intermediate section and is also journaled in this side wall by a suitable anti-friction bearing 64. Mounted upon and rotatable with this shaft as by means of the key 65 is the gear 66 which meshes with the external gear 32 upon the frame 15. The shaft 36 is adapted to be driven from the electric motor 1 by means of the bevel gear 67 keyed to the shaft and meshing with the bevel gear 68 keyed to the motor shaft 69. The bevel gear 68 is mounted in the anti-friction bearing 70, which in turn is mounted in the support 71 located in and carried by the end wall of the intermediate section. Suitable means, such as the nuts 69' upon the motor shaft at opposite ends of the bevel gear 68 and its hub secure the bevel gear and motor shaft together. The housing of the electric motor is detachably mounted upon the same end wall as by means of the studs 72 and the nuts 73 and this housing is positioned to locate the motor shaft concentric with the gear 68 by means of the interengaging shoulders 74 and 75 formed respectively upon the end wall and the motor housing.

The power take-off shaft 4 is journaled in the bearing support 14 and the side wall 12 of the housing intermediate section and extends through the latter side wall. Suitable anti-friction bearings are provided. It will thus be seen that the power take-off shaft 4 and the driven shaft 53 are in axial alignment. Mounted upon and secured to the power take-off shaft intermediate its bearings as by means of the key 76 is the gear 77 which meshes with the gear 78 upon the driven shaft 20 of the reducing device.

It will be noted that the gear 60 is larger and has a greater number of teeth than the meshing gear 59 and that this is also true with respect to the gear 67, as compared to the gear 68, and the gear 77, as compared to the gear 78. It will also be noted that the shaft 36, which is adapted to be driven by the electric motor, positively drives the frame 15 as well as the variable speed device 3 and that this variable speed device in turn positively drives the gearing of the reducing device and in a manner such that the drive gear 16 is rotated in the same direction as that of the frame. As a result, by adjusting the variable speed device 3 the driven shaft of the reducing device and consequently the power take-off shaft can be rotated in either direction at different speeds which can be varied continuously, instead of step by step, and at the same time a constant speed prime mover can be used. The construction is also such that the driven and power take-off shafts can be driven through a great range of speeds. Furthermore, the construction is very compactly arranged and requires but relatively small floor space.

What I claim as my invention is:

1. In a drive unit, a prime mover, a power take-off shaft, a variable speed change mechanism including variable speed belt gearing and epicyclic gearing connected thereto, said speed change mechanism being interposed between and connecting said prime mover and said take-off shaft, and a housing comprising an intermediate section carrying said prime mover, said change speed mechanism and power take-off shaft and through a wall of which said power take-off shaft extends, said housing also comprising interchangeable sections at opposite ends of and closing said intermediate section, the sides of said intermediate section being symmetrical with respect to said power take-off shaft and adapted to be inverted to provide for locating said power take-off shaft at either of opposite sides of said housing.

2. In a drive unit, a prime mover, a power take-off shaft, a variable speed change mechanism including variable speed belt gearing and epicyclic gearing connected thereto, said speed change mechanism being interposed between and connecting said prime mover and said take-off shaft, and a housing comprising an intermediate section carrying said prime mover, said speed change mechanism and said take-off shaft, a top cover for said housing, a base for said housing, the upper and lower ends of said housing, said cover and base having similar dimensions whereby the cover and base are interchangeable, said ends being equally spaced from said take-off shaft, said housing being invertible to position either of said ends in registry with said base to permit locating of the power take-off shaft at either of opposite sides of said housing with its axis in substantially the same plane.

LEONARD J. BISHOP.